US008743878B2

(12) United States Patent
Gavrilov

(10) Patent No.: US 8,743,878 B2
(45) Date of Patent: Jun. 3, 2014

(54) PATH RESOLVE IN SYMMETRIC INFINIBAND NETWORKS

(75) Inventor: Constantine Gavrilov, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 13/221,271

(22) Filed: Aug. 30, 2011

(65) Prior Publication Data
US 2013/0051394 A1 Feb. 28, 2013

(51) Int. Cl.
H04L 12/28 (2006.01)
H04L 12/56 (2006.01)
H04L 12/54 (2013.01)

(52) U.S. Cl.
CPC .............. *H04L 49/358* (2013.01); *H04L 12/56* (2013.01); *H04L 12/28* (2013.01)
USPC ........... 370/392; 370/390; 370/360; 370/359; 370/357; 370/395.54

(58) Field of Classification Search
USPC ............... 370/395.54, 401, 400, 395.31, 428, 370/429, 392, 393; 707/1, 100, 102, 200, 707/203, 204, 205, 206, 202
See application file for complete search history.

(56) References Cited

U.S. PATENT DOCUMENTS

| 6,981,025 | B1 * | 12/2005 | Frazier et al. | 709/209 |
|---|---|---|---|---|
| 7,010,607 | B1 * | 3/2006 | Bunton | 709/228 |
| 7,113,995 | B1 * | 9/2006 | Beukema et al. | |
| 7,136,907 | B1 * | 11/2006 | Nordstrom et al. | 709/220 |
| 7,221,676 | B2 | 5/2007 | Green et al. | |
| 7,243,160 | B2 | 7/2007 | Brahmaroutu | |
| 7,269,168 | B2 * | 9/2007 | Roy et al. | 370/374 |
| 7,551,631 | B1 | 6/2009 | Shapiro | |
| 7,554,924 | B1 * | 6/2009 | Shapiro et al. | 370/242 |
| 7,730,214 | B2 | 6/2010 | Kashyap | |
| 7,822,028 | B1 | 10/2010 | Rimmer | |
| 7,936,753 | B1 * | 5/2011 | Colloff et al. | 370/390 |
| 8,477,779 | B1 * | 7/2013 | Colloff et al. | 370/390 |
| 2002/0165978 | A1 * | 11/2002 | Chui | 709/238 |
| 2003/0033426 | A1 * | 2/2003 | Beukema et al. | 709/234 |
| 2003/0208572 | A1 * | 11/2003 | Shah et al. | 709/223 |
| 2004/0028043 | A1 * | 2/2004 | Maveli et al. | 370/392 |
| 2004/0030763 | A1 * | 2/2004 | Manter et al. | 709/223 |

(Continued)

OTHER PUBLICATIONS

Xuan-Yi Lin et al., "A Multiple LID Routing Scheme for Fat-Tree-Based InfiniBand Networks," 18th International Parallel and Distributed Processing Symposium (IPDPS'04), 2004, pp. 1-10.

*Primary Examiner* — Ian N Moore
*Assistant Examiner* — Phona La
(74) *Attorney, Agent, or Firm* — Griffiths & Seaton PLLC

(57) ABSTRACT

Methods and systems for path resolving in a symmetric InfiniBand network are provided. One method includes transmitting, from a first node, a Management Datagram (MAD) to a second node, the MAD including a query for a Global Unique Identifier (GUID) for a port in the second node. The method further includes receiving the GUID for the port in response to the MAD and determining a Global Identifier (GID) for the port based on the received GUID. One system includes first and second nodes in communication with each other. The first node is configured to transmit a MAD to the second node, the MAD including a query for a GUID for a port in the second node. The first node is further configured to receive the GUID for the port in response to the MAD and determine a GID for the port based on the received GUID.

9 Claims, 3 Drawing Sheets

(56) References Cited

U.S. PATENT DOCUMENTS

| | | |
|---|---|---|
| 2004/0062266 A1* | 4/2004 | Rojas et al. .................... 370/447 |
| 2004/0202189 A1* | 10/2004 | Arndt et al. .................... 370/409 |
| 2005/0111356 A1 | 5/2005 | Whittaker Stewart |
| 2005/0111465 A1* | 5/2005 | Stewart ......................... 370/400 |
| 2005/0141518 A1* | 6/2005 | Schiller et al. ............ 370/395.31 |
| 2006/0056424 A1* | 3/2006 | Lih et al. ....................... 370/401 |
| 2007/0223494 A1* | 9/2007 | Hyyrynen et al. ........ 370/395.54 |
| 2007/0280104 A1* | 12/2007 | Miyoshi et al. ................ 370/229 |
| 2008/0056287 A1* | 3/2008 | Kagan et al. ................... 370/401 |
| 2008/0170510 A1 | 7/2008 | Singh |
| 2009/0077268 A1* | 3/2009 | Craddock et al. ............. 709/250 |
| 2009/0141727 A1* | 6/2009 | Brown et al. ............. 370/395.31 |
| 2009/0141728 A1* | 6/2009 | Brown et al. ............. 370/395.31 |
| 2012/0263187 A1* | 10/2012 | Belanger et al. ............... 370/401 |
| 2012/0307682 A1* | 12/2012 | Johnsen et al. ................ 370/254 |

* cited by examiner

PATH RESOLVE IN SYMMETRIC INFINIBAND NETWORKS

BACKGROUND OF THE INVENTION

1. Field of the Invention

The present invention relates generally to computing systems, and more particularly to, systems and methods for path resolving in symmetric InfiniBand (IB) networks.

2. Description of the Related Art

Individual nodes in IB networks are typically addressed by a LID (local identifier) that is assigned by a Subnet Manager, which a software entity that is responsible for discovery of nodes, assignment of LID addresses, and configuration of a routing table of switches. Certain protocols (e.g., connection mode negotiation) require exchanging of path record information, which may include additional parameters like a source Global Identifier (GID), a destination GID, a data rate, a Maximum Transit Unit (MTU), a partition key (PKEY), a flow label, a service level, a traffic class, and the like parameters. While some of these parameters are rarely used, knowing source and destination GID addresses, MTU, and PKEY are typically required when path record information is exchanged.

Typically, a Subnet Manager (SM) entity is queried for path record information and the existing software API requires to perform the following procedure: 1) resolving the SM address (e.g., port_id_t type); 2) resolving the source GID using the source LID and the SM address; 3) resolving the destination GID using the destination LID and the SM address; and 4) resolving a path record using the source and destination GID addresses and the SM address. Thus, it is generally required to send at least four (4) data packets to resolve the path record. These multiple steps lead to high latency in connection establishment and services bring-up, especially if the Infiniband cluster is booting after activation or software upgrade. The latency increases even more because the API is not atomic (i.e., the SM location may change during a boot and the resolved SM location may become invalid during the course of sending the four packets discussed above, which causes additional timeouts and requires restarting the procedure).

SUMMARY OF THE INVENTION

Various embodiments provide methods for path resolving in a symmetric InfiniBand network comprising a plurality of nodes. One method comprises transmitting, from a first node, a Management Datagram (MAD) to a second node, the MAD including a query for a Global Unique Identifier (GUID) for a port in the second node. The method further comprises receiving, by the first node, the GUID for the port in response to the MAD and determining a Global Identifier (GID) for the port based on the received GUID.

Other embodiments provide systems for path resolving in a symmetric InfiniBand network. One system comprises a first node comprising a processor and memory in communication with the processor, and a second node in communication with the first node. In one embodiment, the memory stores code that, when executed by the processor, causes the processor to transmit a MAD to the second node, the MAD including a query for a GUID for a port in the second node. The processor, when executing the code, is further configured to receive the GUID for the port in response to the MAD and determine a GID for the port based on the received GUID.

Physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising computer program product methods for path resolving in symmetric IB networks are also provided. One physical computer storage medium comprises computer code for transmitting, from a first node, a MAD to a second node, the MAD including a query for a GUID for the port. The physical compute storage medium further comprises computer code for receiving, by the first node, the GUID for the port in response to the MAD and computer code for determining a GID for the port based on the received GUID.

BRIEF DESCRIPTION OF THE DRAWINGS

So that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Various embodiments provide methods for path resolving in symmetric InfiniBand (IB) networks. One method comprises transmitting, from a first node, a Management Datagram (MAD) to a second node, the MAD including a query for a Global Unique Identifier (GUID) for a port in the second node. The method further comprises receiving, by the first node, the GUID for the port in response to the MAD and determining a Global Identifier (GID) for the port based on the received GUID. In one embodiment, the method further comprises querying a local port in the first node for a partition key (PKEY), a GID for the local port, a Maximum Transit Unit (MTU) for the local port, and/or a data rate for the local port; and receiving the one of the PKEY, the GID for the local port, the MTU for the local port, and/or the data rate for the local port in response to the query. Another embodiment further comprises determining a path from the local port to the port based on the determined GID for the port and the PKEY, the GID for the local port, the MTU for the local port, and/or the data rate for the local port.

Figure 1:
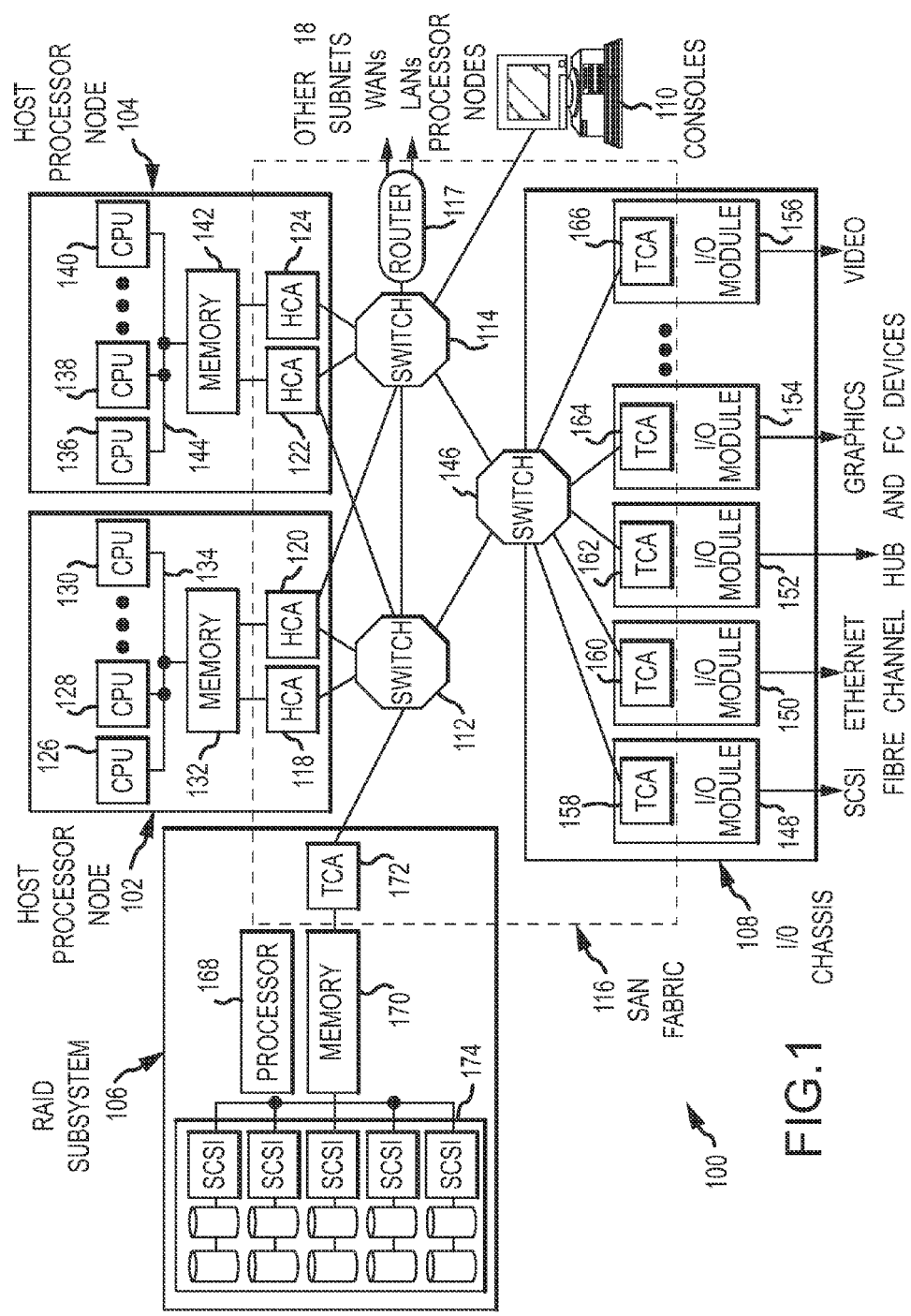
FIG. 1 is a block diagram of an embodiment of a distributed internet protocol (IP) over an Infiniband (IB) system.

Turning now to the figures, FIG. 1 is a block diagram of a distributed computer system, according to an embodiment. The distributed computer system represented in FIG. 1 takes the form of a distributed storage environment 100 including, for example, Network-Attached Storage (NAS) configurations and Storage Area Network (SAN) configurations, and is provided merely for illustrative purposes. Exemplary embodiments of the present invention described below can be implemented on computer systems of numerous other types and configurations. For example, computer systems implementing the exemplary embodiments can range from a small server with one processor and a few input/output (I/O) adapters to massively parallel supercomputer systems with hundreds or thousands of processors and thousands of I/O adapters. Furthermore, the various embodiments discussed herein are applicable to any type of distributed storage environment.

Referring to FIG. 1, environment 100 is a high-bandwidth, low-latency network for interconnecting nodes within a distributed computer system. A node is any component attached to one or more links of a network and forming the origin and/or destination of messages within the network. In the example depicted in FIG. 1, environment 100 includes nodes in the form of host processor node 102, host processor node 104, redundant array independent disk (RAID) subsystem node 106, and I/O chassis node 108. The nodes illustrated in FIG. 1 are for illustrative purposes only, as environment 100 can interconnect any number and any type of independent processor nodes, I/O adapter nodes, and I/O device nodes. Any one of the nodes can function as an end node, which is herein defined to be a device that originates or finally consumes messages or packets in environment 100. In exemplary embodiments, an error handling mechanism in distributed computer systems is present in which the error handling mechanism allows for reliable connection and/or communication between end nodes in distributed computing systems, such as environment 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the packet through environment 100. The trailer generally contains control and cyclic redundancy check (CRC) data to verify that packets are not delivered with corrupted contents.

The environment 100 depicted in FIG. 1 contains the communications and management infrastructure supporting both I/O and interprocessor communications (IPC) within a distributed computer system. The environment 100 shown in FIG. 1 includes a switched communications fabric 116, which allows many devices to concurrently transfer data with high-bandwidth and low-latency in a secure, remotely managed environment. End nodes can communicate over multiple ports and utilize multiple paths through the environment fabric. The multiple ports and paths through the environment shown in FIG. 1 can be employed for fault tolerance and increased bandwidth data transfers.

Environment 100 in FIG. 1 includes three IB switches 112, 114, and 146, and router 117. A switch is a device that connects multiple links together and allows routing of packets from one link to another link within a subnet using a small header destination local identifier (DLID) field. A router is a device that connects multiple subnets together and is capable of routing packets from one link in a first subnet to another link in a second subnet using a large header destination globally unique identifier (DGUID).

In one embodiment, a link is a full duplex channel between any two-network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In environment 100 as illustrated in FIG. 1, host processor node 102, host processor node 104, and I/O chassis 108 include at least one channel adapter (CA) to interface to environment 100. In exemplary embodiments, each CA is an endpoint that implements the CA interface in sufficient detail to source or sink packets transmitted onfabric 116. Host processor node 102 contains multiple CAs or ports in the form of Host Channel Adapters (HCAs) and 120. The terms "host processor node," "source node," and "host" may be used interchangeably herein. Host processor node 104 contains HCAs 122 and 124 each having multiple ports. Host processor node 102 also includes central processing units 126-130 and a memory 132 interconnected by bus system 134. Host processor node 104 similarly includes central processing units 136-140 and a memory 142 interconnected by a bus system 144. The ports of the HCAs 118 and 120 provide a connection from host processor node 102 to switch 112; while ports of the HCAs 122 and 124 provide a connection from host processor node 104 to switches 112 and 114. Here, the multiple ports of the host processor nodes 102 are illustrated as being connected to a single switch 112, 114 and to multiple switches 112, 114. In other embodiments, the nodes 102 can be connected to a single switch 112, 114 or to multiple switches 112, 114. In principle, each HCA can have multiple ports, one node can have multiple HCAs. Accordingly, each node has multiple ports.

In exemplary embodiments, an HCA is implemented in hardware. In this implementation, the HCA hardware offloads much of the central processing unit I/O adapter communication overhead. This hardware implementation of the HCA also permits multiple concurrent communications over a switched network without the traditional overhead associated with communication protocols. In an embodiment, the HCAs and environment 100 in FIG. 1 provide the I/O and IPC consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. The I/O chassis 108 in FIG. 1 includes an I/O switch 146 and multiple I/O modules 148-156. In these examples, the I/O modules 148-156 take the form of adapter cards. Example adapter cards illustrated in FIG. 1 include a SCSI adapter card for I/O module 148, an adapter card to fibre channel hub and fibre channel arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter to couple the adapter cards to the environment fabric. These modules contain target channel adapters (TCAs) 158-166. In the example depicted in FIG. 1, the RAID subsystem node 106 includes a processor 168, a memory 170, a TCA 172, and multiple redundant and/or striped storage disk units 174. TCA 172 can be a fully functional HCA.

Figure 2:
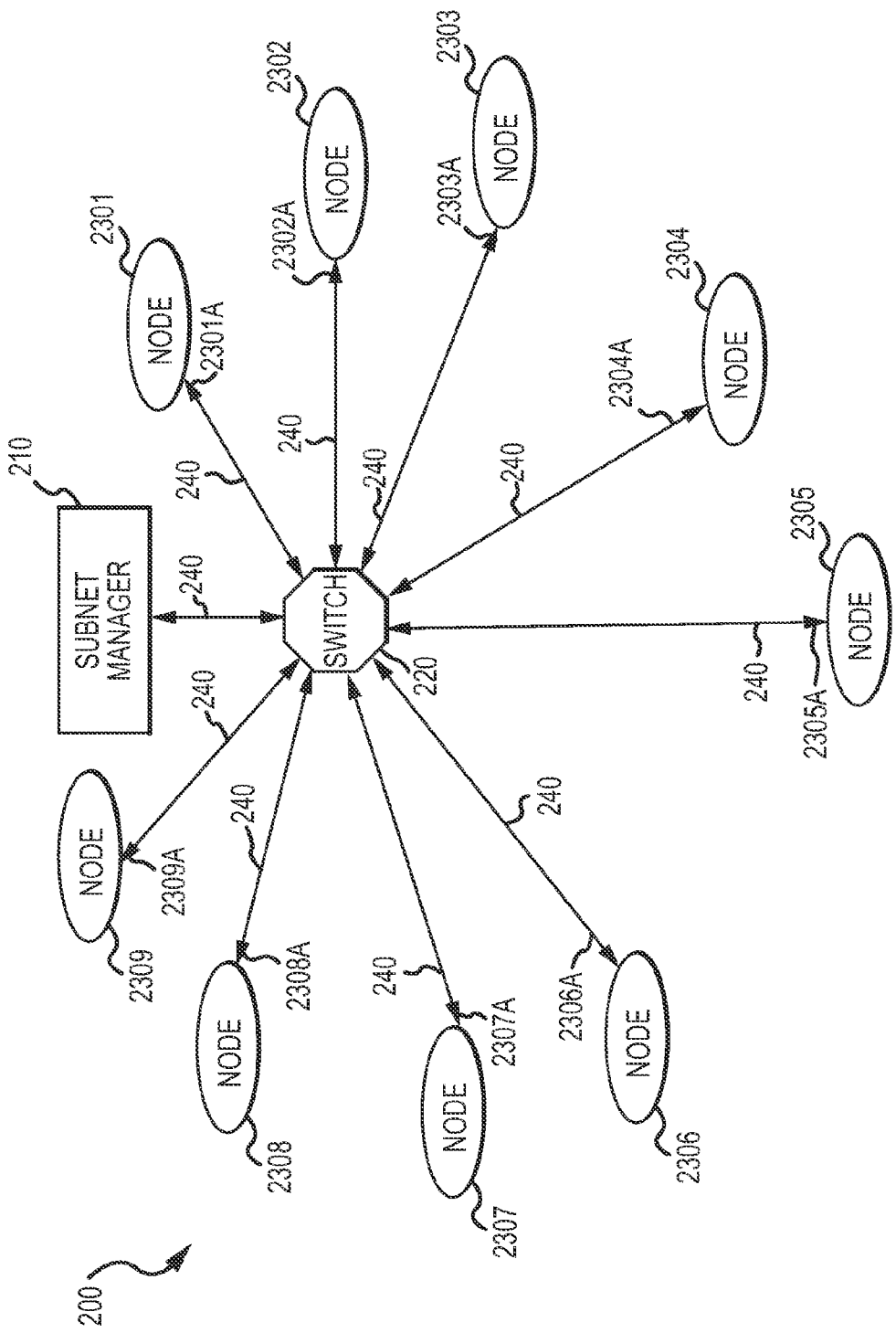
FIG. 2 is a block diagram of one embodiment of a symmetric InfiniBand network.

FIG. 2 is a block diagram of one embodiment of a symmetric IB network 200, operable in, for example, a local area network (LAN), a wide area network (WAN), a SAN, a NAS, and the like distributed storage environments. At least in the illustrated embodiment, IB network 200 comprises a subnet manager (SM) 210, a switch 220, a plurality of nodes 230 (i.e., node 2301, node 2302, node 2303, node 2304, node 2305, node 2306, node 2307, node 2308, and node 2309) comprising one or more ports 2300A (e.g., port 2301A, port 2302A, port 2303A, port 2304A, port 2305A, port 2306A, port 2307A, port 2308A, and port 2309A), and a plurality of bi-directional links 240 coupling SM 210, switches 220, and nodes 230 to each other.

IB network 200 is considered symmetrical because a packet sent between two nodes 230 will utilize the same path regardless of which node is transmitting the packet. For example, a packet sent from node 2305 to node 2308 will use the same path as a packet sent from node 2308 to node 2305. Furthermore, throughout IB network 200 the same Maximum Transmit Unit (MTU) and data rate is used across all of nodes 230.

SM 210 is configured to assign a Local Identifier (LID) address to switch 220 and to each port 2300A in each node 230. That is, switch 220 and each port 2300A will have a LID.

In addition, SM 210 is configured to create a Global Identifier (GID) for switch 220 and each port 2300A by assigning a subnet prefix to switch 220 and to each port 2300A in each node 230. SM 210 subsequently concatenates the assigned subnet prefix with the EUI-64 identifier assigned by the manufacturer of switch 220 and each port 2300A of each node 230 such that each respective GID is composed of the subnet prefix and the EUI-64 identifier. That is, after concatenation switch 220 will have a GID assigned by SM 210 and each port 2300A in each node 230 will have its own GID assigned by SM 210, the GID comprised of a subnet prefix portion and a EUI-64 identifier portion.

Referring now to switch 220, switch 220 may be any IB switch known in the art or developed in the future. As such, switch 220 comprises an assigned Global Unique Identifier (GUID). The assigned GUID is an EUI-64 identifier that is created by concatenating the 24-bit company_id assigned by the IEEE Registration Authority to a 40-bit extension identifier assigned by the manufacturer of switch 220.

Switch 220 will also include the LID and the GID assigned to it by SM 210. Notably, the assigned GID to switch 220 comprises the subnet prefix and the EUI-64 identifier (or GUID). In other words, the GID is comprised of the subnet prefix and the GUID. Each port 2300A in each node 230 is identifiable in a similar manner.

Similar to switch 220, each port 2300A in each node 230 comprises an assigned GUID, which is the EUI-64 identifier assigned by the manufacturer. Furthermore, each port 2300A in each node 230 includes the LID and the GID assigned to it by SM 210. Again, the assigned GID to each respective port 2300A comprises the subnet prefix and the EUI-64 identifier (or GUID). In other words, the GID assigned to each port 2300A is comprised of the subnet prefix and the GUID.

In various embodiments, each node 230 is configured to resolve a path from itself to one or more other nodes in IB network 200. To resolve a path to a particular destination node, each node 230 is configured to transmit a Local Identifier (LID) routed Management Datagram (MAD) to the destination node. The MAD includes a query from the transmitting node for a GUID for the target node. In one embodiment, the MAD is transmitted utilizing a Source Local Identifier (SLID) in the source port to a Destination Local Identifier (DLID) in a port in the target node.

In response to the MAD, the port in the transmitting node is configured to receive the GUID for the port in the target node. The transmitting node is also configured to determine the GID for the port in the target node based on the received GUID. Since each node 230 is associated with SM 210, the transmitting node knows in advance the subnet prefix for the port in the target node. Therefore, each node 230 is configured to determine the GID of the port in the target node by concatenating the received GUID with the subnet prefix from SM 210, which results in the GID for the port in the target node.

Each node is further configured to query its local port for the partition key (PKEY) for the local port, the GID for the local port, the Maximum Transmit Unit (MTU) for the local port, and/or the data rate for the local port. In response to the query, the transmitting node will receive the PKEY, the GID, the MTU, and the data rate from the local port. Because IB network 200 includes the same parameters for each node 230, the local port will include and know the PKEY of the port in the target node, the MTU of the port in the target node, and the data rate for the port in the target node. Furthermore, the local port will also inherently know its own GID.

After determining the GID for the port in the target node and receiving the PKEY, the GID, the MTU, and/or the data rate from the local port, a path from the local port to the port in the target node can be determined. Thus, each node 230 is configured to determine a path to the port in the target node based on the determined GID for the port in the target node and the PKEY, the GID, the MTU, and/or the data rate for the local port.

In addition to determining the path to the port in the target node, each node 230 is configured to determine that the path to the port in the target node is valid based on receiving the GUID from the target node. That is, when a node 230 receives a communication from the target node in response to its query for the GUID, the node 230 is able to conclude that the path to the target node is valid.

Notably, the embodiment illustrated in FIG. 2 includes one (1) switch 220. However, the various embodiments of IB network 200 are not limited to a single switch 220. That is, various other embodiments of IB network 200 may include greater than one switch 220 so long as each node 230 is coupled to the switches 220 in a manner that creates symmetry throughout IB network 200. In other words, more complex topologies with redundant connections to multiple switches 220 are also possible, provided SM 210 is instructed to create symmetric routing tables on switches 220. Specifically, two switches 220 interconnected with multiple links 240 is possible, provided SM 210 configures symmetric routing tables across both switches 220; namely, any pair of nodes 230 that communicate across a switch 220 will use the same path independent of the direction of the communication.

Furthermore, the embodiment illustrated in FIG. 2 includes nine (9) nodes 230. However, the various embodiments of IB network 200 are not limited to nine nodes 230. That is, various other embodiments of IB network 200 may include more or less than nine nodes 230 and each node 230 may include any number of ports greater than zero.

The following example may be helpful in better understanding the scope and principles of the various embodiments discussed herein. However, the scope of the various embodiments is not limited to the following example.

In one example, node 2306 desires to determine a path from itself to node 2302. Specifically, node 2306 desires to determine a path from port 2306A to port 2302A in node 2302. To determine a path, node 2306 will transmit a LID routed MAD to port 2302A. In response to the MAD, port 2302A will transmit its GUID back to port 2306A. With the GUID of port 2302A, node 2306 will determine the GID for port 2302A. Since port 2302A is associated with SM 210, node 2306 knows the subnet prefix for port 2302A. Thereafter, node 2306 will determine the GID of port 2302A by concatenating the received GUID with the subnet prefix of SM 210, which results in the GID for port 2302A.

In addition, node 2306 will query port 2306A for the PKEY, the GID of port 2306A, the MTU, and/or the data rate. In response to the query, the node 2306 will receive the PKEY, the GID for port 2306A, the MTU, and the data rate from port 2306A. Since IB network 200 utilizes the same parameters for each node 230, port 2306A and port 2302A will include the same PKEY, MTU, and data rate. Now that node 2306 has the GID for port 2302A and the GID for port 2306A, and the PKEY for ports 2302A and 2306A, the MTU for ports 2302A and 2306A, and/or the data rate for ports 2302A and 2306A, node 2306 has all of the information needed to determine a path from port 2306A to port 2302A. Therefore, node 2306 will determine an appropriate path from port 2306A to port 2302A.

In addition to determining the path from port 2306A to port 2302A, node 2306 will also determine that the path from port 2306A to port 2302A is valid. Specifically, node 2306 is able to conclude that the path is valid because node 2306 received the communication from node 2302 in response to its query.

Notably, if node 2302 desired to determine a path to node 2306, node 2302 would utilize the same process as node 2306 discussed above. Furthermore, since IB network 200 is symmetrical, node 2302 would determine and utilize the same path to node 2306 as node 2306 determined and utilized to node 2302.

Figure 3:
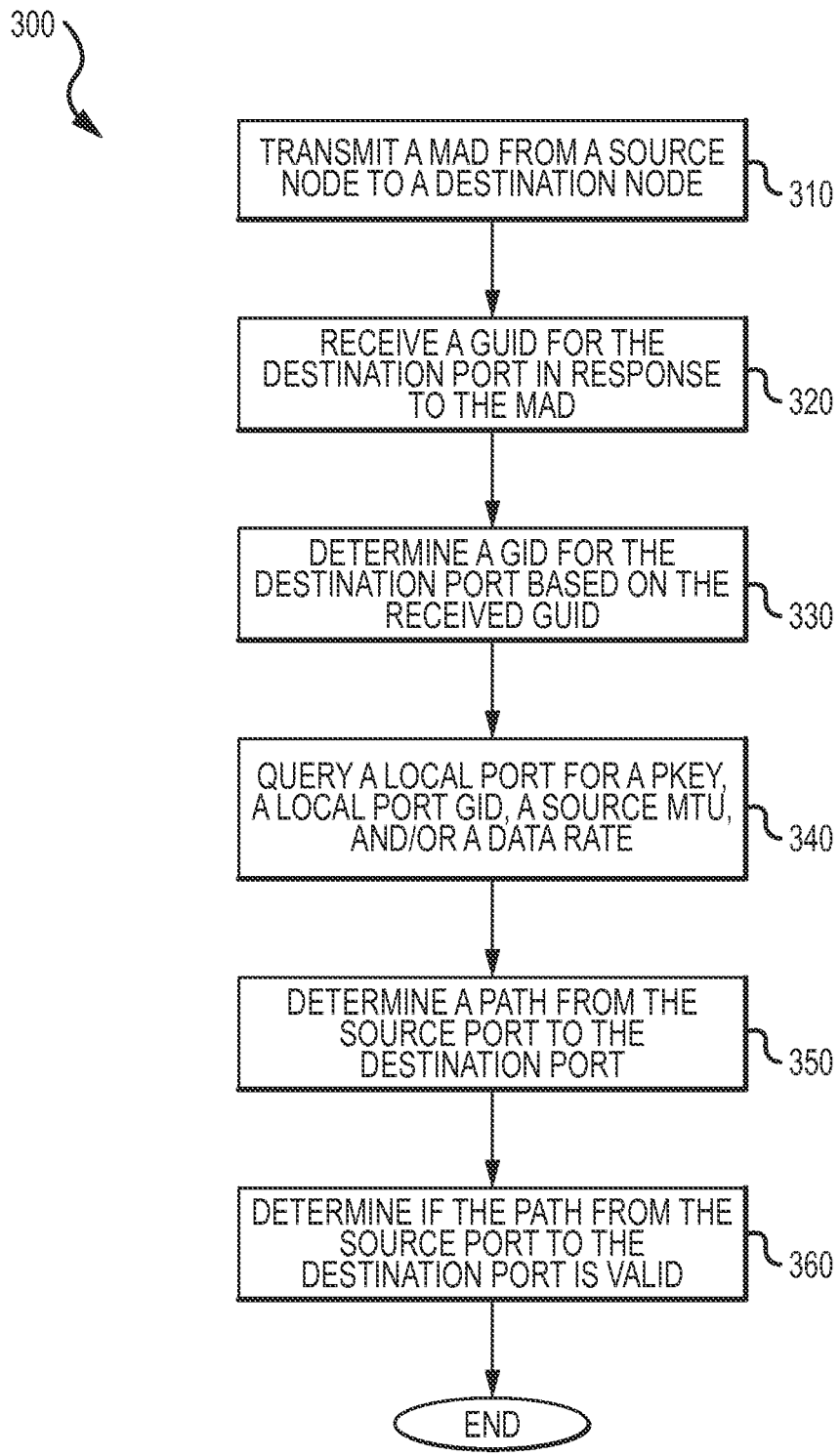
FIG. 3 is a flow diagram of one embodiment of a method for path resolving in a symmetric InfiniBand network.

With reference now to FIG. 3, FIG. 3 is a flow diagram of one embodiment of a method 300 for path resolving in a symmetric IB network (e.g., IB network 200). At least in the illustrated embodiment, method 300 begins by a source node transmitting a LID routed MAD to a destination node (block 310). Here, the MAD includes a query from the source node for a GUID for a port in the destination node. Furthermore, in one embodiment, the MAD is transmitted utilizing a SLID for the source node to a DLID in a port in the destination node.

In response to the MAD, the source node receives the GUID for the port in the destination node (block 320) and determines a GID for the port in the destination node based on the received GUID (block 330). Since the source node is associated with the same SM as the destination node, the source node knows in advance the subnet prefix for the port in the destination node. Therefore, in one embodiment, the source node determines the GID for the port in the destination node by concatenating the GUID received from the destination node with the subnet prefix, which results in the GID for the port in the destination node.

In one embodiment, method 300 further comprises querying a local port in the source node for a PKEY for the local port, a GID for the local port, a MTU for the local port, and/or a data rate for the local port (block 340). Because the IB network includes the same parameters for each node 230, the local port will include and know the PKEY, the MTU, and data rate for the port in the destination node. Furthermore, the local port will also know its own GID. In response to the query, the source node will receive the PKEY, the GID, the MTU, and the data rate for the local port.

After determining the GID for the port in the destination node and knowing the PKEY, the GID, the MTU, and/or the data rate for the local port, a path from the local port in the source node to the port in the destination node can then be determined. Thus, method 300 further comprises determining a path from the local port in the source node to the port in the destination node based on the determined GID for the port in the destination node and the PKEY, the GID, the MTU, and/or the data rate for the local port (block 350).

In addition to determining a path from the local port in the source node to the port in the destination node, method 300 further comprises determining that the path from the source node to the destination node is valid based on receiving the GUID for the port in the destination node (block 360). That is, because the source node receives a communication from the destination node in response to its query, the source node is able to conclude that the path from the local port in the source node to the port in the destination node is valid.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for path resolving in a symmetric InfiniBand network comprising a plurality of nodes, the method comprising:
receiving, by a first node, a predetermined subnet prefix for each element in the symmetric InfiniBand network;
transmitting, from the first node, a Management Datagram (MAD) to a second node, the MAD including a query for a Global Unique Identifier (GUID) for a port in the second node, the GUID comprising an assigned identifier for the port;
receiving, by the first node, the GUID for the port in response to the MAD, wherein the predetermined subnet prefix and the GUID are received by the first node separate from each other;
determining a Global Identifier (GID) for the port via concatenating the received GUID and the predetermined subnet prefix;
querying a local port in the first node for each of a partition key (PKEY) for the local port, a GID for the local port, a Maximum Transit Unit (MTU) for the local port, and a data rate for the local port; and
receiving the PKEY, the GID for the local port, the MTU for the local port, and the data rate for the local port in response to the query,
wherein transmitting the MAD comprises transmitting the MAD utilizing a Source Local Identifier (SLID) in the first node to a Destination Local Identifier (DLID) in the port.

2. The method of claim 1, further comprising determining a path from the local port to the port based on the determined GID for the port, the PKEY, the GID for the local port, the MTU for the local port, and the data rate for the local port.

3. The method of claim 1, further comprising determining that a path from the local port to the port is valid based on receiving the GUID from the port.

4. A system for path resolving in a symmetric InfiniBand network including a predetermined subnet prefix for each element in the symmetric InfiniBand network, the system comprising:
a first node; and
a second node in communication with the first node, wherein the first node is configured to:
receive, by the first node, a predetermined subnet prefix for each element in the symmetric InfiniBand network,
transmit a Management Datagram (MAD) to the second node, the MAD including a query for a Global Unique Identifier (GUID) for a port the second node, the GUID comprising an assigned identifier for the port
receive the GUID for the port in response to the MAD, wherein the predetermined subnet prefix and the GUID are received by the first node separate from each other, and
determine a Global Identifier (GID) for the port via concatenating the received GUID and the predetermined subnet prefix;
a Source Local Identifier (SLID) in the first node;
a Destination Local Identifier (DLID) in the second node, wherein:
when transmitting the MAD, the first node is configured to transmit the MAD utilizing the SLID to the DLID; and
a local port in the first node, wherein the first node is further configured to:
query the local port for each of a partition key (PKEY) for the local port, a GID for the local port, a Maximum Transit Unit (MTU) for the local port, and a data rate for the local port, and
receive the PKEY for the local port, the GID for the local port, the MTU for the local port, and the data rate for the local port in response to the query.

5. The system of claim 4, wherein the first node is further configured to determine a path from the local port to the port based on the determined GID for the port, the PKEY for the local port, the GID for the local port, the MTU for the local port, and the data rate for the local port.

6. The system of claim 4, wherein the first node is further configured to determine that a path from the local port to the port is valid based on receiving the GUID for the port.

7. A physical computer storage memory comprising a computer program product method for path resolving in a symmetric InfiniBand network comprising a plurality of nodes and a predetermined subnet prefix for each element in the symmetric InfiniBand network, the physical computer-readable medium comprising:
  computer code for receiving, by a first node, a predetermined subnet prefix for each element in the symmetric InfiniBand network;
  computer code for transmitting, from the first node, a Management Datagram (MAD) to a second node, the MAD including a query for a Global Unique Identifier (GUID) for a port in the second node, the GUID comprising an assigned identifier for the port;
  computer code for receiving, by the first node, the GUID for the port in response to the MAD, wherein the predetermined subnet prefix and the GUID are received by the first node separate from each other;
  computer code for determining a Global Identifier (GID) for the port via concatenating the received GUID and the predetermined subnet prefix;
  computer code for querying a local port in the first node for each of a partition key (PKEY) for the local port, a GID for the local port, a Maximum Transit Unit (MTU) for the local port, and a data rate for the local port; and
  computer code for receiving the PKEY for the local port, the GID for the local port, the MTU for the local port, and the data rate for the local port in response to the query,
    wherein the computer code for transmitting the MAD comprises computer code for transmitting the MAD utilizing the SLID to the DLID.

8. The physical computer storage memory of claim 7, further comprising computer code for determining a path from the local port to the port based on the determined GID for the port, the PKEY for the local port, the GID for the local port, the MTU for the local port, and the data rate for the local port.

9. The physical computer storage memory of claim 7, further comprising computer code for determining that a path from the local port to the port is valid based on receiving the GUID from the port.

* * * * *